Oct. 21, 1958      N. H. JEFFERY      2,857,189
BUSHING OF REINFORCED ELASTOMER AND METHOD OF MANUFACTURE
Filed Jan. 10, 1956
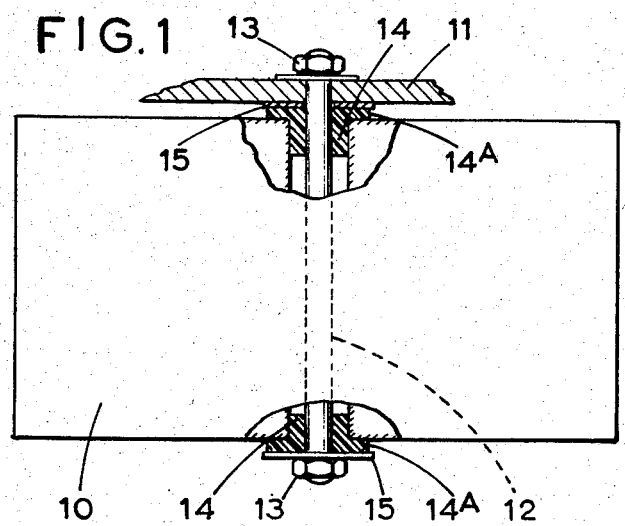
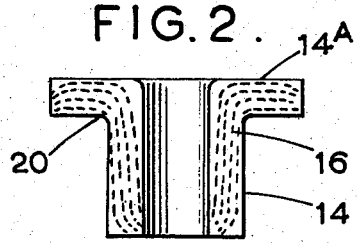
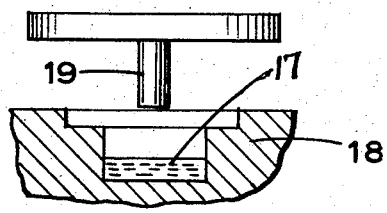
INVENTOR
Norman Howard Jeffery
BY Leech and Radue
ATTORNEYS United States Patent Office 2,857,189
Patented Oct. 21, 1958

2,857,189
BUSHING OF REINFORCED ELASTOMER AND METHOD OF MANUFACTURE

Norman Howard Jeffery, Mickleover, Derby, England, assignor to Rolls-Royce Limited, Derby, England Application January 10, 1956, Serial No. 558,378

Claims priority, application Great Britain January 14, 1955

4 Claims. (Cl. 287—85)

This invention is for methods of reinforcing silicone elastomers and for reinforced articles of silicone elastomer.

It is known to reinforce silicone elastomers, sometimes called polysiloxane elastomers, by the addition of finely divided powders of various kinds, but the amount of such fillers which are required to produce articles which when vulcanised will have hardness of over 65 British standard degrees, results in a reduction of mechanical properties, particularly when used at temperatures over 200° C.

It is also known to reinforce silicone elastomers with woven fabrics but such form of reinforcement introduces difficulties in the fabrication of articles by extrusion or moulding.

According to this invention the silicone elastomer is reinforced by short lengths of glass fibre.

Various lengths of glass fibre may be used. We have found a length of 0.25" to be very suitable for introduction into a silicone elastomer, but it is known that considerable breaking-down of these lengths may occur during mixing depending on the viscosity of the rubber and on the time of mechanical working such as on a two-roll mill.

The fibre should be intimately mixed into the silicone elastomers in such a way as to ensure an even dispersion of the fibres throughout the mix. This may be carried out for example on mixing rolls or in an internal type mixer or by hand stirring in cases where the silicone elastomer is of suitably low viscosity.

The glass fibres may be manufactured in known manner by an extrusion process and consist of fine threads of the type commonly used in woven glass fibre materials for example with diameters of the order of 0.0005" or less.

Articles can be produced from a silicone elastomer so reinforced by extrusion moulding or the like and when heated in the normal way including the vulcanization, articles will have a better resistance to lateral flow than others known to us of equivalent hardness. Also by correct orientation of the glass fibres within the article, improvements in other properties such as resistance to tear can be achieved. For example, improved properties may be obtained in a moulded sheet by use of a "blank" prepared from a number of thin rolled sheets laid-up in such a way that the direction of "grain" in each layer is placed at an angle to that in contiguous layers.

An example of this invention is illustrated in the accompanying drawings.

Figure 1 is a diagrammatic view of a component carried from the fixed structure by a mounting which includes silicone elastomer bushings.

Figure 2 is an enlarged section of one of the bushings, and

Figure 3 is a section through a mould used for forming the bushings illustrated in Figure 2.

Figure 1 shows a component 10 such as an oil cooler of an internal combustion engine mounted from the engine structure 11 by means of a threaded rod 12 and nuts 13.

Between the rod and the component are inserted silicone elastomer bushings 14 having flanges 14A sandwiched between the component and washers 15, one washer abutting against one of the nuts 13 and the other washer abutting against the engine structure 11.

In Figure 2 the reinforcing glass fibres are shown in dotted lines at 16. The "grain" as will be seen flows around the angle 20 between the flange 14A and main body of the bushing.

In Figure 3 the elastomer is shown at 17 in a mould 18. The plunger 19 when forced into the mould causes the elastomer to flow upwards and radially outwards to form the bushing shown in Figure 2 with the "grain" flowing in the direction illustrated.

Silicone elastomer bushings when used in a position as illustrated in Figure 1 to support an oil cooler on an internal combustion engine in an aircraft, have failed in the outer angle 20 between the flange 14A and the body of the bushing 14, and in the flange. By use of a reinforced bushing according to this invention this trouble has been overcome.

What I claim is:

1. A hollow bushing comprising a cylindrical portion terminating in a radial flange portion and composed of a uniformly vulcanized silicone elastomer reinforced by short lengths of glass fibre evenly distributed throughout the elastomer.

2. A hollow bushing as claimed in claim 1 in which the glass fibres have a diameter of up to 0.0005 inch.

3. A hollow bushing as claimed in claim 2 in which the length of the glass fibres is about 0.25 inch.

4. A method of producing a hollow bushing comprising a cylindrical portion terminating in a radial flange portion which comprises the steps of incorporating glass fibres in a silicone elastomer, milling the elastomer, placing the elastomer in a fluid state in a mould having dimensions corresponding to the desired external dimensions of the bushing and forcing into the elastomer a plunger sized for the hollow to cause the elastomer to flow upwards to form the cylindrical portion of the bushing and outwards to form the radial flange portion.

References Cited in the file of this patent

UNITED STATES PATENTS

| | | |
|---|---|---|
| 1,952,115 | Borst | Mar. 27, 1934 |
| 2,073,419 | Houdaille et al. | Mar. 9, 1937 |
| 2,525,070 | Greenwald et al. | Oct. 10, 1950 |
| 2,708,289 | Collings | May 17, 1955 |